(12) United States Patent
Nakamoto et al.

(10) Patent No.: US 9,490,501 B2
(45) Date of Patent: Nov. 8, 2016

(54) ELECTROLYTIC SOLUTION FOR FLUORIDE ION BATTERY AND FLUORIDE ION BATTERY

(71) Applicants: TOYOTA JIDOSHA KABUSHIKI KAISHA, Toyota-shi, Aichi-ken (JP); KYOTO UNIVERSITY, Kyoto-shi, Kyoto (JP)

(72) Inventors: Hirofumi Nakamoto, Kyoto (JP); Zempachi Ogumi, Kyoto (JP); Jun-ichi Yamaki, Kyoto (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 0 days.

(21) Appl. No.: 14/687,199

(22) Filed: Apr. 15, 2015

(65) Prior Publication Data

US 2015/0303514 A1    Oct. 22, 2015

(30) Foreign Application Priority Data

Apr. 17, 2014 (JP) .................. 2014-085442

(51) Int. Cl.
| | |
|---|---|
| *H01M 10/0563* | (2010.01) |
| *H01M 10/05* | (2010.01) |
| *H01M 10/0567* | (2010.01) |
| *H01M 10/0568* | (2010.01) |
| *H01M 10/0569* | (2010.01) |

(52) U.S. Cl.
CPC ......... *H01M 10/0563* (2013.01); *H01M 10/05* (2013.01); *H01M 10/0567* (2013.01); *H01M 10/0568* (2013.01); *H01M 10/0569* (2013.01); *H01M 2300/002* (2013.01); *H01M 2300/0025* (2013.01); *H01M 2300/0028* (2013.01); *H01M 2300/0037* (2013.01); *H01M 2300/0045* (2013.01)

(58) Field of Classification Search
CPC ................................. H01M 10/0563
See application file for complete search history.

(56) References Cited

U.S. PATENT DOCUMENTS

| | | | | |
|---|---|---|---|---|
| 2011/0143219 | A1* | 6/2011 | Weiss .................. | H01M 4/5835 429/338 |
| 2012/0164541 | A1* | 6/2012 | Darolles ............... | H01M 6/164 429/326 |
| 2014/0162143 | A1* | 6/2014 | Watahiki ........... | H01M 10/0568 429/338 |

FOREIGN PATENT DOCUMENTS

| | | | |
|---|---|---|---|
| CN | 101630593 | * | 1/2010 |
| CN | 101630593 A | | 1/2010 |
| JP | 2014501434 A | | 1/2014 |
| WO | 2012/087414 A2 | | 6/2012 |
| WO | WO 2013015369 | * | 1/2013 |

OTHER PUBLICATIONS

CN101630593 MT.*
JP2014-501434 MT.*
Sep. 9, 2015 Search Report issued in European Patent Application No. 15164063.8.

* cited by examiner

*Primary Examiner* — Patrick Ryan
*Assistant Examiner* — Alex Usyatinsky
(74) *Attorney, Agent, or Firm* — Oliff PLC

(57) ABSTRACT

An electrolytic solution for a fluoride ion battery includes: a fluoride salt; and an alcohol material that has one OH group, and in which a molar ratio of the alcohol material is more than 1 with respect to fluoride ions of the fluoride salt.

10 Claims, 6 Drawing Sheets

COMPARATIVE EXAMPLE

ELECTROLYTIC SOLUTION FOR FLUORIDE ION BATTERY AND FLUORIDE ION BATTERY

INCORPORATION BY REFERENCE

The disclosure of Japanese Patent Application No. 2014-085442 filed on Apr. 17, 2014 including the specification, drawings and abstract is incorporated herein by reference in its entirety.

BACKGROUND OF THE INVENTION

1. Field of the Invention

The present invention relates to an electrolytic solution for a fluoride ion battery in which the stability of fluoride ions is improved.

2. Description of Related Art

As a battery having high voltage and high energy density, for example, a Li ion battery is known. The Li ion battery is a cation-based battery using a reaction between Li ions and a positive electrode active material and a reaction between Li ions and a negative electrode active material. On the other hand, as an anion-based battery, a fluoride ion battery using a reaction of fluoride ions is known. For example, US 2012/0164541 A discloses a fluoride ion battery including: an anode; a cathode; an electrolyte including a fluoride salt; and a predetermined additive.

In claim 4 of US 2012/0164541 A, for example, an alcohol is selected as a solvent. However, the other sections of US 2012/0164541 A do not disclose the use of alcohol at all.

Since the stability of fluoride ions is low, there is a problem in that an activity of fluoridating an active material is low. In other words, due to their high reactivity, fluoride ions react with other materials (in particular, an electrolytic solution) before reacting with an active material. Therefore, there is a problem in that the fluoride ions may not react with the active material sufficiently.

SUMMARY OF THE INVENTION

The invention has been made to provide an electrolytic solution for a fluoride ion battery in which the stability of fluoride ions is improved.

According to a first aspect of the invention, there is provided an electrolytic solution for a fluoride ion battery including: a fluoride salt; and an alcohol material that has one OH group. A molar ratio of the alcohol material is more than 1 with respect to fluoride ions of the fluoride salt.

According to the present invention, by using the alcohol material having one OH group, an electrolytic solution for a fluoride ion battery in which the stability of fluoride ions is improved can be provided.

The above-described electrolytic solution for a fluoride ion battery may further include an ionic liquid for dissolving the fluoride salt.

In addition, according to a second aspect of the invention, there is provided a fluoride ion battery including: a positive electrode active material layer; a negative electrode active material layer; and an electrolyte layer that is formed between the positive electrode active material layer and the negative electrode active material layer. The electrolyte layer includes the above-described electrolytic solution for a fluoride ion battery.

According to the invention, by using the above-described electrolytic solution for a fluoride ion battery, a fluoride ion battery having high capacity can be provided.

The electrolytic solution for a fluoride ion battery according to the invention exhibits an effect capable of improving the stability of fluoride ions.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an electrolytic solution for a fluoride ion battery and a fluoride ion battery according to embodiments of the invention will be described in detail.

A. Electrolytic Solution for Fluoride Ion Battery

An electrolytic solution for a fluoride ion battery according to an embodiment of the invention includes: a fluoride salt; and an alcohol material that has one OH group, and in which a molar ratio of the alcohol material is more than 1 with respect to fluoride ions of the fluoride salt.

According to this electrolytic solution for a fluoride ion battery, by using the alcohol material having one OH group, an electrolytic solution for a fluoride ion battery in which the stability of fluoride ions is improved can be provided. As a result, an activity of fluoride ions fluoridating an active material can be improved, a cell reaction stably occurs in an electrode, and a high-capacity battery can be obtained. When the stability of fluoride ions is low, the side reactions including the degradation reaction of the solvent are progressed during discharge and charge of the fluoride ion battery. Namely, if the stability of fluoride ions is improved, the side reactions are suppressed. As a result, the coulombic efficiency during discharge and charge of the fluoride ion battery is improved. According to the embodiment of the present invention, the coulombic efficiency is improved, because the stability of fluoride ions is improved. The reason why the stability of fluoride ions is improved is presumed to be as follows.

Figure 1:
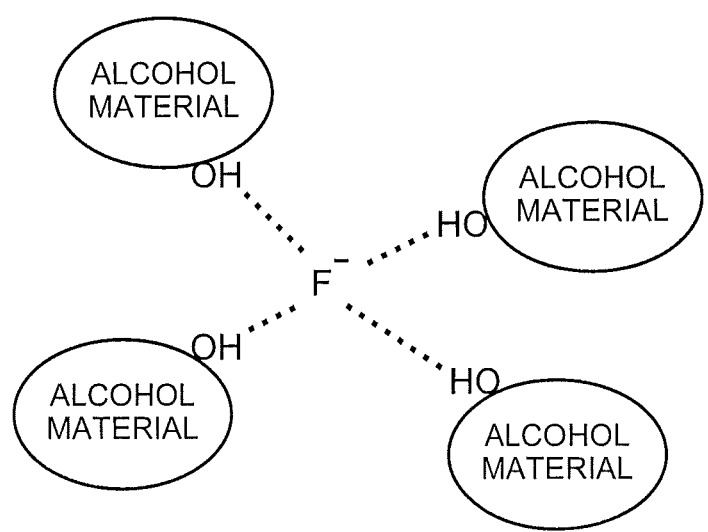
FIG. 1 is a schematic diagram showing an assumed mechanism of the present invention.

That is, as shown in FIG. 1, by using the alcohol material having one OH group at a predetermined ratio, plural alcohol materials can be arranged so as to surround one fluoride ion ($F^-$). An H atom of the OH group of the alcohol material is likely to selectively interact with $F^-$ (The H atom of the OH group is easy to form a hydrogen bond with F⁻). On the other hand, an O atom of the OH group is not likely to release H⁺ due to its high electronegativity and thus does not excessively bind to (is not reactive with) a fluoride ion. As a result, it is presumed that the stability of fluoride ions is improved.

In addition, when a compound having proton donor ability reacts with F⁻, HF may be produced. HF has toxicity, and thus, typically, a compound having proton donor ability is not used in an electrolytic solution for a fluoride ion battery. The OH group has proton donor ability, but the degree thereof is lower than that of an ordinary acid or the like. By controlling a molar ratio of the alcohol material such that OH groups surrounds one fluoride ion (F⁻), that is, such that the molar ratio is more than 1 with respect to fluoride ions, the stability of fluoride ions can be improved.

Figure 2:
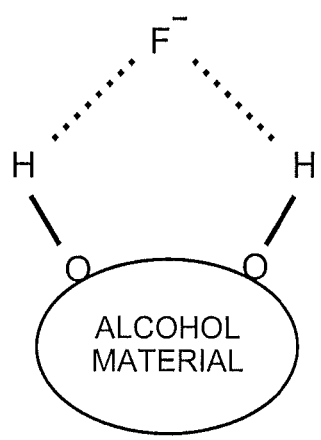
FIG. 2 is a schematic diagram showing an assumed mechanism of a comparative example.

In addition, as described below in Comparative Examples, the effects of the invention cannot be obtained with an alcohol material having two or more OH groups. The reason is presumed to be as follows. That is, as shown in FIG. 2, when two or more OH groups are present in the molecule of the alcohol material, the OH groups strongly bind to F⁻ due to the chelating effect, and F⁻ is excessively stabilized. On the other hand, the present invention has an advantageous effect in that F⁻ can be appropriately stabilized by using the alcohol material having one OH group.

In particular, in the embodiment of the invention, an electrode active material can be fluoridated or defluoridated by adding the alcohol material to a solvent in which fluoridation or defluoridation does not occur. Further, the degree of fluoridation or defluoridation can be adjusted by adjusting the addition amount of the alcohol material. In addition, in the embodiment of the invention, since the stability of fluoride ions is improved, an effect of improving the coulombic efficiency and an effect of preventing the formation of hydrofluoric acid (HF) are also obtained. Hereinafter, each configuration of the electrolytic solution for a fluoride ion battery according to the embodiment of the invention will be described.

1. Alcohol Material

The alcohol material according to the embodiment of the invention is a material having one OH group (monovalent alcohol material). The alcohol material may be used as a solvent for dissolving a fluoride salt or as an additive for stabilizing fluoride ions.

The alcohol material is not particularly limited as long as it has one OH group. The alcohol material may be a primary alcohol, a secondary alcohol, or a tertiary alcohol. The number of carbon atoms in the alcohol material is, for example, one or more. On the other hand, the number of carbon atoms in the alcohol material is 12 or less and preferably 6 or less. In addition, when the alcohol material has a carbon chain, the carbon chain may be linear or branched. Hydrogen binding to carbon of the carbon chain may be substituted with other elements. Examples of the other elements include halogen elements such as fluorine. In addition, the alcohol material may be a saturated compound or an unsaturated compound. However, the alcohol material is preferably a saturated compound due to the high chemical stability thereof. In addition, the alcohol material according to the invention further contains a phenol material (material having a phenolic OH group).

Typically, the alcohol material has a hydrocarbon skeleton and an OH group. The alcohol material may have only a hydrocarbon skeleton and an OH group or may further have another functional group. The other functional group is a functional group capable of obtaining the effects of the invention. It is preferable that the alcohol material does not have a functional group having higher proton donor ability than the OH group because this functional group having higher proton donor ability than the OH group may produce HF. Examples of the functional group having higher proton donor ability than the OH group include a carboxylic acid group. In addition, in order to prevent the proton dissociation of the OH group, the alcohol material may have an electron-donating substituent.

Examples of the alcohol material according to the embodiment of the invention include methanol, ethanol, 1-propanol, 2-propanol (isopropyl alcohol), 1-butanol, 2-butanol, tert-butyl alcohol, pentanol, hexanol, heptanol, octanol, phenol, and phenol derivatives (for example, cresol).

In addition, when the alcohol material is used as a solvent, the solvent of the electrolytic solution may be the alcohol material alone or a mixture of the alcohol material and other solvents. A ratio of the alcohol material with respect to all the solvents is, for example, 10 mol % or more, preferably 30 mol % or more, more preferably 50 mol % or more, and still more preferably 70 mol % or more.

Examples of the other solvents include an ionic liquid and a nonaqueous solvent. The ionic liquid generally has high viscosity, and when being used in combination with the alcohol material, can obtain an electrolytic solution having low viscosity. The ionic liquid is a material having a melting point of 100° C. or lower. The melting point of the ionic liquid is preferably 50° C. or lower and more preferably 25° C. or lower.

Examples of a cation of the ionic liquid include a piperidinium-based cation, a pyrrolidinium-based cation, an imidazolium-based cation, an ammonium cation, and a phosphonium cation.

Examples of an anion of the ionic liquid include an amide anion represented by a bis(fluorosulfonyl)amide (FSA) anion or a bis(trifluoromethanesulfonyl)amide (TFSA) anion; a phosphate anion represented by a hexafluorophosphate anion and a tris(pentafluoroethyl)trifluorophosphate anion; a tetrafluoroborate (TFB) anion; and a triflate anion.

The kind of the nonaqueous solvent is not particularly limited, and examples thereof include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide (DMSO), and arbitrary mixtures of the above-described nonaqueous solvents.

In addition, in the embodiment of the invention, an electrode active material can be fluoridated or defluoridated by adding the alcohol material to a solvent in which fluoridation or defluoridation does not occur. As the solvent in which fluoridation or defluoridation does not occur, for example, a solvent having an acid dissociation constant (pKa) of 9 or more may be used. Specific examples of such a solvent include DMSO, acetonitrile, N,N,N-trimethyl-N-propylammonium bis(trifluoromethanesulfonyl)amide (N1113TFSA), and N,N-diethyl-N-methyl-N-(2-methoxymethyl)ammonium bis(trifluorosulfonyl)amide (N1221o1TFSA).

When the alcohol material is used as an additive, a ratio of the alcohol material to the electrolytic solution is, for example, 1 ppm or more, preferably 10 ppm or more, more preferably 100 ppm or more, and still more preferably 500 ppm or more. On the other hand, the ratio of the alcohol material is, for example, 100000 ppm or less. In addition, when the alcohol material is used as an additive, a ratio of the alcohol to the electrolytic solution is, for example, $1\times10^{-6}$ mol % or more, preferably $1\times10^{-5}$ mol % or more, and more preferably $1\times10^{-4}$ mol % or more. On the other hand, the ratio of the alcohol material is, for example, 40 mol % or less.

2. Fluoride Salt

The fluoride salt according to the embodiment of the invention is not particularly limited as long as it can produce fluoride ions which are reactive with an active material, and may be an organic fluoride salt or an inorganic fluoride salt. In addition, the fluoride salt may be an ionic liquid.

A cation of the fluoride salt is not particularly limited, and examples thereof include a complex cation. Examples of the complex cation include an alkylammonium cation, an alkylphosphonium cation, and an alkylsulfonium cation. The alkylammonium cation may be, for example, a cation represented by the following formula.

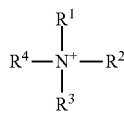

In the formula, $R^1$ to $R^4$ each independently represent an alkyl group or a fluoroalkyl group. The number of carbon atoms in R1 to R4 is, for example, 10 or less, and may be 5 or less or may be 3 or less.

An anion of the fluoride salt is not particularly limited as long as it can produce fluoride ions which are reactive with an active material, but is preferably $F^-$.

A concentration of the fluoride salt in the electrolytic solution is, for example, within a range of 0.4 mol % to 45 mol % and preferably within a range of 0.7 mol % to 10 mol %.

3. Electrolytic Solution for Fluoride Ion Battery

In the embodiment of the invention, as shown in FIG. 1, by using the alcohol material having one OH group, plural alcohol materials can be arranged so as to surround one fluoride ion ($F^-$). Typically, a molar ratio of the alcohol material is more than 1 with respect to fluoride ions contained in the electrolytic solution. The molar ratio is preferably 2 or more, more preferably 3 or more, and still more preferably 4 or more. On the other hand, the molar ratio is, for example, preferably 10000 or less. In addition, the molar ratio can be calculated from the concentrations of the fluoride ions and the alcohol material in the electrolytic solution. These concentrations can be obtained using, for example, $^{19}$F-NMR or $^1$H-NMR.

In an $F(HF)_x^-$ anion, $F^-$ is not likely to be dissociated from HF. Therefore, it may be difficult to sufficiently fluoridate an active material. When x represents a real number of more than 0, for example, $0<x\leq5$ is satisfied. Therefore, it is preferable that the electrolytic solution for a fluoride ion battery does not substantially contain an $F(HF)_x^-$ anion. "Substantially not containing an $F(HF)_x^-$ anion" represents that a ratio of the $F(HF)_x^-$ anion to all the anions present in the electrolytic solution is 0.5 mol % or less. The ratio of the $F(HF)_x^-$ anion is preferably 0.3 mol % or less.

B. Fluoride Ion Battery

Figure 3:
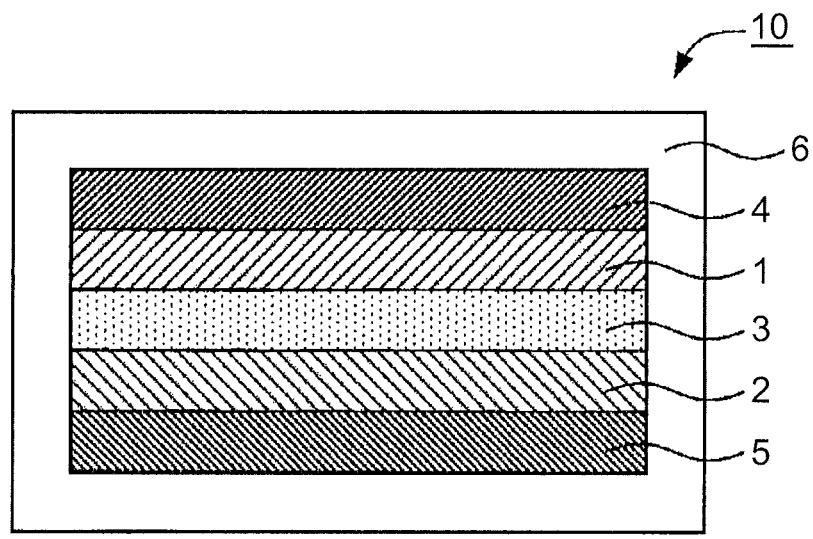
FIG. 3 is a cross-sectional diagram showing an example of a fluoride ion battery according to the present invention.

FIG. 3 is a cross-sectional diagram showing an example of a fluoride ion battery according to an embodiment of the present invention. A fluoride ion battery 10 shown in FIG. 3 includes: a positive electrode active material layer 1; a negative electrode active material layer 2; an electrolyte layer 3 that is formed between the positive electrode active material layer 1 and the negative electrode active material layer 2; a positive electrode current collector 4 that collects the current of the positive electrode active material layer 1; a negative electrode current collector 5 that collects the current of the negative electrode active material layer 2; and a battery case 6 that accommodates these members. In addition, the electrolyte layer 3 contains "A. electrolytic solution for a fluoride ion battery" described above.

According to the embodiment of the invention, by using the above-described electrolytic solution for a fluoride ion battery, a fluoride ion battery having high capacity can be provided. Hereinafter, each configuration of the fluoride ion battery according to the embodiment of the invention will be described.

1. Electrolyte Layer

The electrolyte layer according to the embodiment of the invention is a layer that is formed between the positive electrode active material layer and the negative electrode active material layer. The electrolyte layer contains the above-described electrolytic solution for a fluoride ion battery. The thickness of the electrolyte layer greatly varies depending on the configuration of the battery and is not particularly limited.

2. Positive Electrode Active Material Layer

The positive electrode active material layer according to the embodiment of the invention contains at least the positive electrode active material. In addition to the positive electrode active material, the positive electrode active material layer further contains at least a conductive material and a binder.

Typically, the positive electrode active material according to the embodiment of the invention is an active material which is defluoridated during discharging. Examples of the positive electrode active material include metal alone, alloys, metal oxides, and fluorides of the above positive electrode active materials. Examples of a metal element contained in the positive electrode active material include Cu, Ag, Ni, Co, Pb, Ce, Mn, Au, Pt, Rh, V, Os, Ru, Fe, Cr, Bi, Nb, Sb, Ti, Sn, and Zn. Among these, Cu, $CuF_x$, Fe, $FeF_x$, Ag, and $AgF_x$ are preferably used as the positive electrode active material. In the above description, x represents a real number of more than 0. Cu and $CuF_x$ are preferably used because they have high energy density. In addition, additional examples of the positive electrode active material include carbon materials and fluorides thereof. Examples of the carbon materials include graphite, coke, and carbon nanotube. In addition, further additional examples of the positive electrode active material include polymer materials. Examples of the polymer materials include polyaniline, polypyrrole, polyacetylene, and polythiophene.

The conductive material is not particularly limited as long as it has desired electron conductivity, and for example, a carbon material may be used. Examples of the carbon material include carbon blacks such as acetylene black, Ketjen black, furnace black, and thermal black. On the other hand, the binder is not particularly limited as long as it is chemically and electrically stable, and examples thereof include fluorine-based binders such as polyvinylidene fluoride (PVDF) and polytetrafluoroethylene (PTFE). In addition, the higher the content of the positive electrode active material in the positive electrode active material layer, the better from the viewpoint of capacity. In addition, the thickness of the positive electrode active material layer greatly varies depending on the configuration of the battery and is not particularly limited.

3. Negative Electrode Active Material Layer

The negative electrode active material layer according to the embodiment of the invention contains at least the negative electrode active material. In addition to the negative electrode active material, the negative electrode active material layer further contains at least a conductive material and a binder.

Typically, the negative electrode active material according to the embodiment of the invention is an active material which is fluoridated during discharging. In addition, as the negative electrode active material, an arbitrary material having a lower potential than the positive electrode active material may be selected. Therefore, the above-described positive electrode active materials may be used as the negative electrode active material. Examples of the negative electrode active material include metal alone, alloys, metal oxides, and fluorides of the above negative electrode active materials. Examples of a metal element contained in the negative electrode active material include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among these, Mg, $MgF_x$, Al, $AlF_x$, Ce, $CeF_x$, Ca, $CaF_x$, Pb, and $PbF_x$ are preferably used as the negative electrode active material. In the above description, x represents a real number of more than 0. In addition, as the negative electrode active material, the above-described carbon materials and polymer materials may also be used.

As the conductive material and the binder, the same materials as those described above in the positive electrode active material layer may be used. In addition, the higher the content of the negative electrode active material in the negative electrode active material layer, the better from the viewpoint of capacity. In addition, the thickness of the negative electrode active material layer greatly varies depending on the configuration of the battery and is not particularly limited.

4. Other Configurations

The fluoride ion battery according to the embodiment of the invention includes at least the negative electrode active material layer, the positive electrode active material layer, and the electrolyte layer described above. Typically, the fluoride ion battery further includes the positive electrode current collector that collects the current of the positive electrode active material layer; and the negative electrode current collector that collects the current of the negative electrode active material layer. Examples of the shape of the current collector include a foil shape, a mesh shape, and a porous shape. In addition, the fluoride ion battery according to the embodiment of the invention may further include a separator that is formed between the positive electrode active material layer and the negative electrode active material layer. A battery having higher stability can be obtained.

5. Fluoride Ion Battery

The fluoride ion battery according to the embodiment of the invention is not particularly limited as long as it includes the positive electrode active material layer, the negative electrode active material layer, and the electrolyte layer described above. In addition, the fluoride ion battery may be a primary battery or a secondary battery. However, the fluoride ion battery is preferably a secondary battery because it can be repeatedly charged and discharged and is used as, for example, a vehicle-mounted battery. In addition, examples of the fluoride ion battery include a coin type, a laminate type, a cylindrical type, and a square type.

The invention is not particularly limited to the above-described embodiments. The embodiments are exemplary.

Hereinafter, the invention will be described in more detail using Examples.

Example 1

Tetramethyl ammonium fluoride (TMAF, fluoride salt, manufactured by Sigma-Aldrich Co., LLC.) and ethanol (solvent, manufactured by Kanto Chemical Co., Inc.) were weighed and mixed at a molar ratio (fluoride salt:solvent) of 1:100. Next, the mixture was stirred in a fluororesin hermetic container under conditions of 25° C. and 24 hours. As a result, an evaluation electrolytic solution was obtained.

Example 2

An evaluation electrolytic solution was obtained with the same method as that of Example 1, except that isopropyl alcohol (manufactured by Kanto Chemical Co., Inc.) was used as the solvent.

Example 3

Tetramethyl ammonium fluoride (TMAF, fluoride salt, manufactured by Sigma-Aldrich Co., LLC.), ethanol (solvent X1, manufactured by Kanto Chemical Co., Inc.), and N,N,N-trimethyl-N-propylammonium bis(trifluoromethanesulfonyl)amide (N1113TFSA, solvent X2, manufactured by Kanto Chemical Co., Inc.) were weighed and mixed at a molar ratio (fluoride salt:solvent X1:solvent X2) of 1:6:540. Next, the mixture was stirred in a fluororesin hermetic container under conditions of 60° C. and 24 hours. As a result, an evaluation electrolytic solution was obtained (amount of ethanol: 1380 ppm). N1113TFSA is commercially available.

Example 4

Tetramethyl ammonium fluoride (TMAF, fluoride salt, manufactured by Sigma-Aldrich Co., LLC.), ethanol (solvent Y1, manufactured by Kanto Chemical Co., Inc.), and dimethyl sulfoxide (DMSO, solvent Y2, manufactured by Kanto Chemical Co., Inc.) were weighed and mixed at a molar ratio (fluoride salt:solvent Y1:solvent Y2) of 2:11:9000. Next, the mixture was stirred in a fluororesin hermetic container under conditions of 25° C. and 24 hours. As a result, an evaluation electrolytic solution was obtained (amount of ethanol: 730 ppm).

Comparative Example 1

Tetramethyl ammonium fluoride (TMAF, fluoride salt, manufactured by Sigma-Aldrich Co., LLC.) and N,N,N-trimethyl-N-propylammonium bis(trifluoromethanesulfonyl)amide (N1113TFSA, solvent, manufactured by Kanto Chemical Co., Inc.) were weighed and mixed at a molar ratio (fluoride salt:solvent) of 1:50. Next, the mixture was stirred in a fluororesin hermetic container under conditions of 60° C. and one hour. As a result, an evaluation electrolytic solution was obtained.

Comparative Example 2

Tetramethyl ammonium fluoride (TMAF, fluoride salt, manufactured by Sigma-Aldrich Co., LLC.) and dimethyl sulfoxide (DMSO, solvent, manufactured by Kanto Chemical Co., Inc.) were weighed and mixed at a molar ratio (fluoride salt:solvent) of 1:100. Next, the mixture was stirred in a fluororesin hermetic container under conditions of 25° C. and 72 hour. As a result, an evaluation electrolytic solution was obtained.

Comparative Example 3

An evaluation electrolytic solution was obtained with the same method as that of Comparative Example 2, except that ethylene glycol (manufactured by Sigma-Aldrich Co., LLC.) was used as the solvent.

Comparative Example 4

An evaluation electrolytic solution was obtained with the same method as that of Comparative Example 2, except that 1,3-propanediol (manufactured by Sigma-Aldrich Co., LLC.) was used as the solvent.

Comparative Example 5

An evaluation electrolytic solution was obtained with the same method as that of Comparative Example 2, except that glycerol (manufactured by Alfa Aesar Co., LLC.) was used as the solvent; and the stirring temperature was changed to 40° C.

[Evaluation]
(Cyclic Voltammetry Measurement)

CV measurement was performed on the evaluation electrolytic solutions obtained in Examples 1 to 4 and Comparative Examples 1 to 5. Specifically, a dipping type three-electrode cell was evaluated in a glove box in an Ar atmosphere. A Cu plate was used as a working electrode, and a mixed electrode of PTFE, acetylene black (AB), and carbon fluoride was used as a counter electrode. The mixed electrode contains PTFE, acetylene black (AB), and carbon fluoride at a weight ratio of 1:2:7. In addition, Vycor glass was used as a reference electrode to separate an evaluation electrolytic solution. In the reference electrode, Ag wire was dipped in an acetonitrile solution in which silver nitrate and tetrabutylammonium perchlorate were respectively dissolved at a concentration of 0.1 M. In addition, the measurement was performed under conditions of room temperature and a sweep rate of 10 mV/s.

Figure 4:
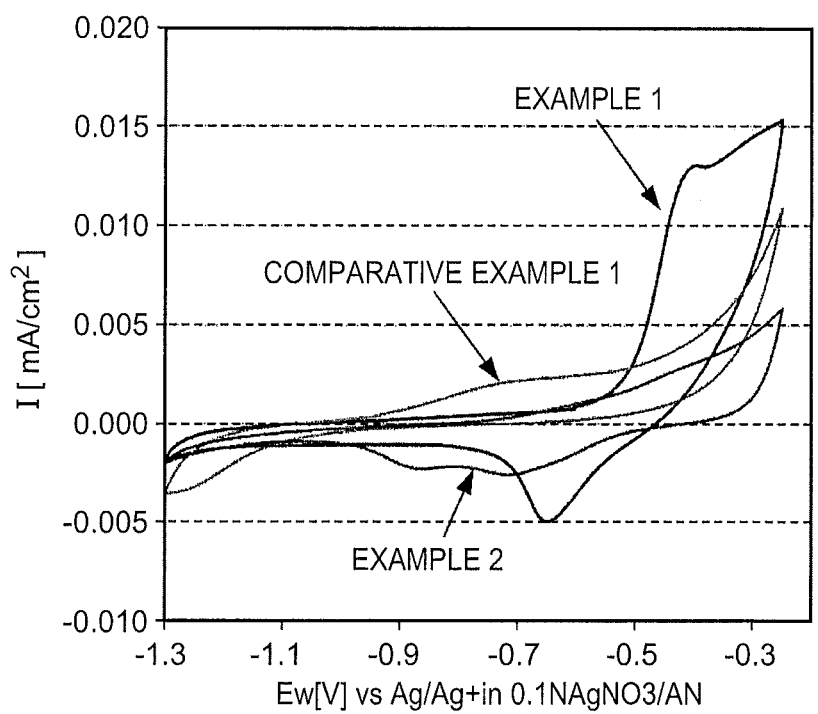
FIG. 4 is a graph showing the results of CV measurement on evaluation electrolytic solutions obtained in Examples 1 and 2 and Comparative Example 1.

FIG. 4 is a graph showing the results of CV measurement on the evaluation electrolytic solutions obtained in Examples 1 and 2 and Comparative Example 1. As shown in FIG. 4, in Examples 1 and 2, an oxidation current peak formed along with the fluoridation of copper was observed at about −0.45 V, and a reduction current peak formed along with the defluoridation of copper fluoride was observed at about −0.7 V. On the other hand, in Comparative Example 1, unlike in Examples 1 and 2, an oxidation current peak formed along with the fluoridation of copper and a reduction current peak formed along with the defluoridation of copper fluoride were not observed. In this way, when the alcohol material having one OH group was used, the fluoridation and defluoridation of metal were observed.

Figure 5:
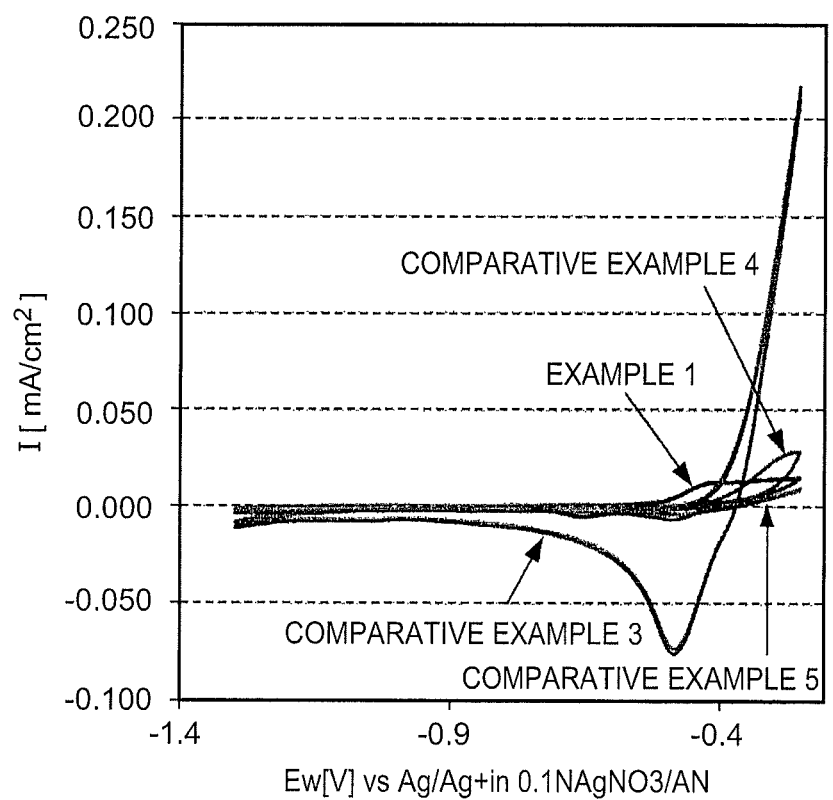
FIG. 5 is a graph showing the results of CV measurement on evaluation electrolytic solutions obtained in Example 1 and Comparative Examples 3 to 5.

FIG. 5 is a graph showing the results of CV measurement on the evaluation electrolytic solutions obtained in Example 1 and Comparative Examples 3 to 5. As shown in FIG. 5, in Example 1, an oxidation current peak formed along with the fluoridation of copper was observed at about −0.45 V, and a reduction current peak formed along with the defluoridation of copper fluoride was observed at about −0.7 V. On the other hand, in Comparative Examples 3 to 5, unlike in Example 1, an oxidation current peak formed along with the fluoridation of copper and a reduction current peak formed along with the defluoridation of copper fluoride were not observed. In this way, when the alcohol material having two or more OH groups was used, the fluoridation and defluo- ridation of metal were not observed, and a dissolution reaction of Cu and a precipitation reaction of Cu progressed.

Figure 6:
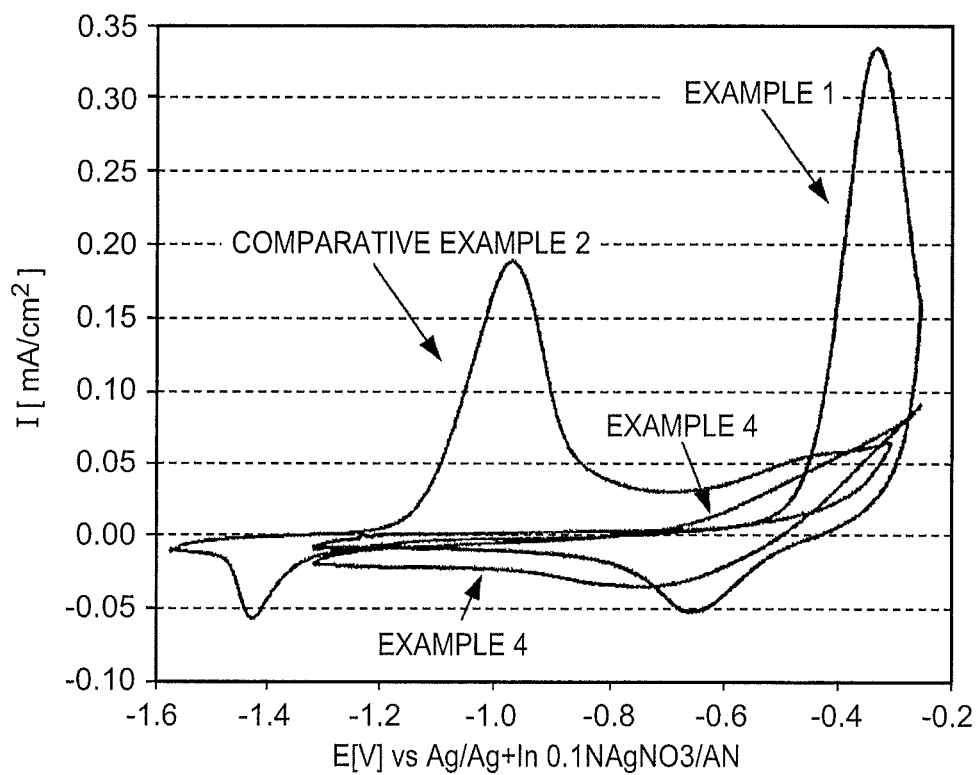
FIG. 6 is a graph showing the results of CV measurement on evaluation electrolytic solutions obtained in Examples 1 and 4 and Comparative Example 2.

FIG. 6 is a graph showing the results of CV measurement on the evaluation electrolytic solutions obtained in Examples 1 and 4 and Comparative Example 2. As shown in FIG. 6, in Example 4, as in the case of Example 1, an oxidation current peak formed along with the fluoridation of copper was observed to a small degree at about −0.45 V, and a reduction current peak formed along with the defluoridation of copper fluoride was observed at about −0.7 V. On the other hand, in Comparative Example 2, unlike in Examples 1 and 4, a reduction current peak formed along with the defluoridation of copper fluoride was not observed. In this way, it was found that the defluoridation of metal fluoride progressed by adding the alcohol material having one OH group to a solvent (organic solvent) in which defluoridation did not occur.

Figure 7:
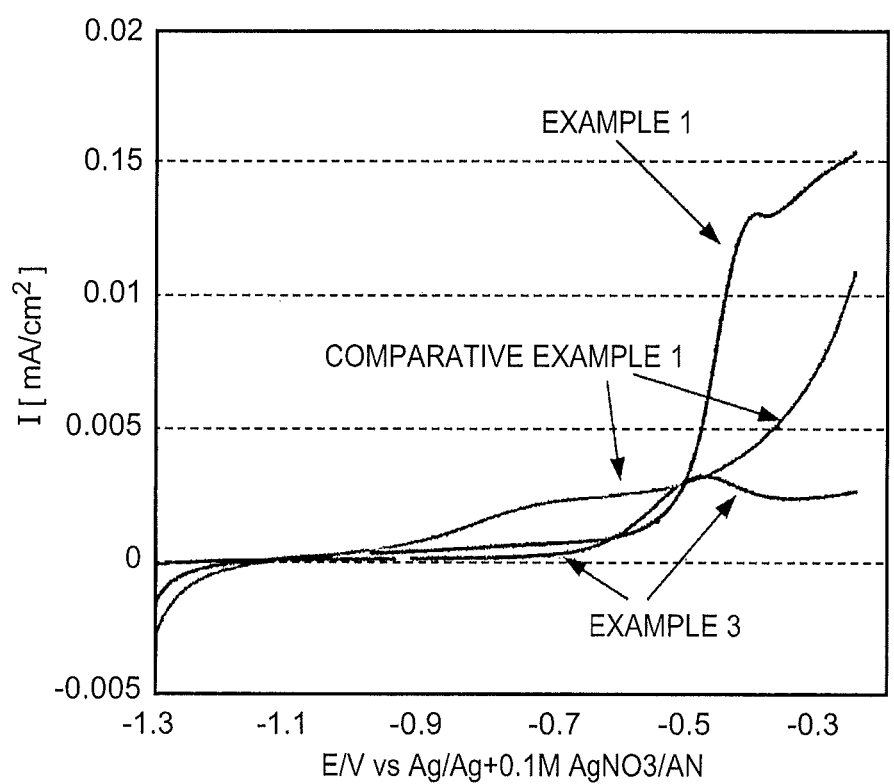
FIG. 7 is a graph showing the results of CV measurement on evaluation electrolytic solutions obtained in Examples 1 and 3 and Comparative Example 1.

FIG. 7 is a graph showing the results of CV measurement on the evaluation electrolytic solutions obtained in Examples 1 and 3 and Comparative Example 1. As shown in FIG. 7, in Example 3 in which a small amount of ethanol was added as an additive, as in the case of Example 1, an oxidation current peak formed along with the fluoridation of copper was observed at about −0.45 V. On the other hand, in Comparative Example 1 in which ethanol was not added, unlike in Examples 1 and 3, an oxidation current peak formed along with the fluoridation of copper was not observed. In this way, it was found that the fluoridation of metal progressed by adding the alcohol material having one OH group to a solvent (ionic liquid) in which fluoridation did not occur.

What is claimed is:

1. A fluoride ion battery comprising:
   a positive electrode active material;
   a negative electrode active material; and
   an electrolyte layer that contains an electrolyte solution, the electrolyte solution comprising:
   a fluoride salt; and
   an alcohol material that has molar ratio more than 1 with respect to fluoride ions of the fluoride salt and has only one OH group, the alcohol material selected from the group consisting of methanol, ethanol, 1-propanol, 2-propanol (isopropyl alcohol), 1-butanol, 2-butanol, tert-butyl alcohol, pentanol, hexanol, heptanol, octanol, phenol, and phenol derivatives.

2. The fluoride ion battery according to claim 1, further comprising
   an ionic liquid for dissolving the fluoride salt.

3. The fluoride ion battery according to claim 1, wherein the number of carbon atoms in the alcohol material is 12 or less.

4. The fluoride ion battery according to claim 1, wherein the alcohol material does not have a functional group having higher proton donor ability than the OH group.

5. The fluoride ion battery according to claim 1, further comprising
   an ionic liquid as a solvent,
   wherein a melting point of the ionic liquid is 50° C. or lower.

6. The fluoride ion battery according to claim 1, further comprising
   a solvent in which fluoridation or defluoridation does not occur.

7. The fluoride ion battery according to claim 6, wherein an acid dissociation constant of the solvent in which fluoridation or defluoridation does not occur is 9 or more.

8. The fluoride ion battery according to claim 1, wherein a ratio of the alcohol material to all the solvents is 10 mol % or more.

9. The fluoride ion battery according to claim 1, wherein a cation of the fluoride salt is a complex cation.

10. The fluoride ion battery according to claim 1, wherein a concentration of the fluoride salt in the electrolytic solution is 0.4 mol % to 45 mol %.

* * * * *